United States Patent
Van Hoogenbemt et al.

(10) Patent No.: US 7,251,720 B2
(45) Date of Patent: Jul. 31, 2007

(54) FLEXIBLE DIGITAL SIGNAL PROCESSOR

(75) Inventors: Stefaan Margriet Albert Van Hoogenbemt, Mechelen (BE); Roel Luc Rita Marichal, Hove (BE); Bert René Anna Maria Aerts, Steenhuffel (BE)

(73) Assignee: Alcatel, Paris (FR)

( * ) Notice: Subject to any disclaimer, the term of this patent is extended or adjusted under 35 U.S.C. 154(b) by 308 days.

(21) Appl. No.: 10/729,023

(22) Filed: Dec. 8, 2003

(65) Prior Publication Data

US 2004/0122880 A1 Jun. 24, 2004

(30) Foreign Application Priority Data

Dec. 19, 2002 (EP) ................................ 02293176

(51) Int. Cl.
*G06F 9/302* (2006.01)
*G06F 13/00* (2006.01)

(52) U.S. Cl. ....................................................... 712/35
(58) Field of Classification Search ................ 712/235, 712/35, 220, 221; 708/523, 524, 525
See application file for complete search history.

(56) References Cited

U.S. PATENT DOCUMENTS

| | | | |
|---|---|---|---|
| 5,034,907 A | * | 7/1991 | Johnson et al. ............. 708/319 |
| 5,524,258 A | * | 6/1996 | Corby et al. ................... 712/19 |
| 5,650,861 A | * | 7/1997 | Nakajima et al. ........... 382/239 |
| 5,742,639 A | * | 4/1998 | Fasulo et al. ............... 375/219 |
| 5,752,070 A | * | 5/1998 | Martin et al. .................. 712/33 |

(Continued)

FOREIGN PATENT DOCUMENTS

WO WO 98 32071 A 7/1998

OTHER PUBLICATIONS

L. Kiss et al, "SACHEM, a Versatile DMT-Based Modern Transceiver for ADSL", IEEE Journal of Solid-State Circuits, vol. 34, No. 7, Jul. 1999, pp. 1001-1009.

*Primary Examiner*—Eric Coleman
(74) *Attorney, Agent, or Firm*—Sughrue Mion, PLLC

(57) ABSTRACT

The invention describes a digital signal processor to execute at least one dedicated operation of a dedicated system such as an digital front-end of any digital subscriber line system. The digital signal processor is a flexible digital signal processor and comprises therefor:

Figure 1:
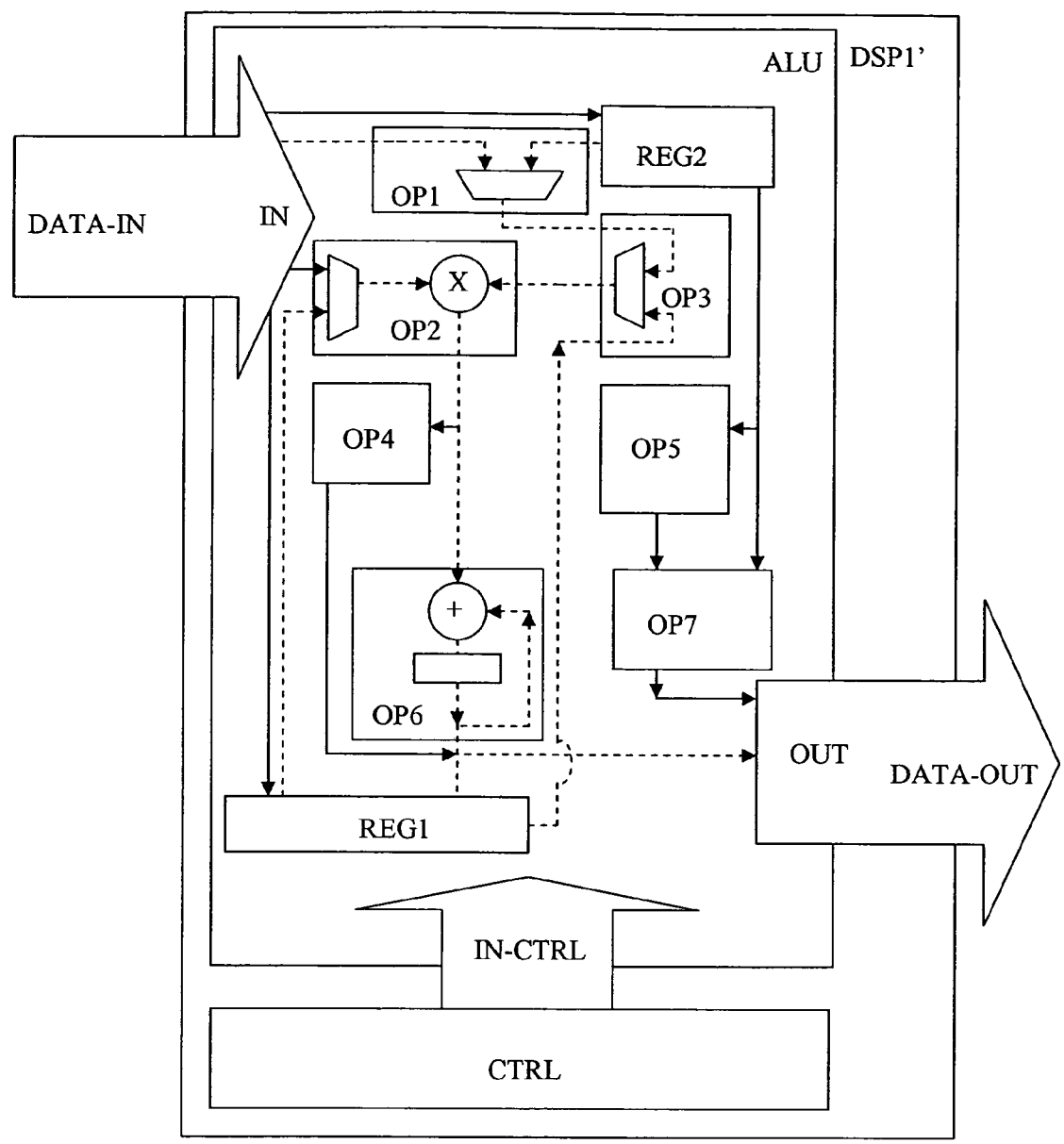

an arithmetic logical unit that comprises a plurality of inputs to receive input data; and a predefined interconnected plurality of basic operators coupled to the plurality of inputs for execution of a respective basic operation on the received input data; and a plurality of control inputs coupled between the predefined plurality of basic operators and a program controller; and the program controller to activate via the plurality of control inputs, for at least one phase of a control program of the program controller and under control of an actual phase of the at least one phase, one or more basic operators of the plurality of basic operators and to enable thereby the one or more basic operators to execute its respective basic operation and to realize therewith at least part of a dedicated operation of the dedicated system; and the arithmetic logical unit further comprises a plurality of outputs to receive, upon realization of each phase of the at least one phase of the control program, an output data whereby the output data represent a result of the execution of the at least one dedicated operation of the dedicated system.

6 Claims, 2 Drawing Sheets

U.S. PATENT DOCUMENTS

| | | |
|---|---|---|
| 5,822,606 A | 10/1998 | Morton |
| 5,948,053 A | 9/1999 | Kamiya |
| 6,061,367 A | 5/2000 | Siemers |
| 6,152,613 A * | 11/2000 | Martin et al. .................. 712/33 |
| 6,728,871 B1 * | 4/2004 | Vorbach et al. ............. 712/226 |
| 6,832,306 B1 * | 12/2004 | Ganapathy et al. ........... 712/41 |

* cited by examiner

FLEXIBLE DIGITAL SIGNAL PROCESSOR

The present invention relates to a digital signal processor according to the preamble of claim 1, and to a method being executed by such a digital signal processor according to the preamble of claim 6, and to a digital subscriber line system that comprises a digital front-end system with such a digital signal processor according to the preamble of claim 5.

Such a digital signal processor is already known in the art and knows many applications. Indeed, digital signal processors are for instance used in a dedicated system such as a digital subscriber line system DSL where they perform different dedicated operations. The published article with Title "Sachem, a versatile DMT-based modem transceiver for ADSL" by L. Kiss et All. At ESSCIRC 1998, The Hague, describes such a Asymmetric Digital Subscriber Line system DSL system. Herein, the complete digital processing (physical medium dependent PMD) of the Discrete Multitone modulation scheme and transmission convergence layer (TC) has been integrated into a single device, processed in $0.35\mu$ standard CMOS process. Power and area are kept well within limits making this device a cost effective solution for ADSL line and network terminating systems. New designs methods were used to meet the severe time-to-market constraints of this high complexity device. In paragraph 2.1 of this article a dedicated system i.e. Digital Signal Processing of a Front End of such an ADSL system is described. The architecture of this dedicated system with its dedicated operations is shown in FIG. 4. Such a dedicated operation is e.g. a decimation operation, a Finite Response Filter operation or a biquad operation.

Other dedicated systems are known with e.g. the Digital Signal Processing in the Front-End for a digital chip for multi-XDSL i.e. calculation of the dedicated Arithmetic Logical Unit ALU type of functions between the Fast Fourier Transformation FFT or the Inverse Fast Fourier Transformation IFFT and the Analogue to Digital conversion A/D or Digital to Analogue conversion D/A in XDSL. Such dedicated operations are in the in-exhaustive list of interpolation operation, decimation operation, biquad filter operation, complex to real inversion, shifting of up of the signals spectrum to higher frequencies, real to complex inversion, shifting down of the spectrum . . .

These dedicated operation are usual implemented by means of especially designed XDSL components like e.g. the above described Sachem component or by means of standard components, Digital Signal Processor solutions, which are once programmed to execute the required front-end XDSL functions.

Such an especially designed component is not flexible since for an e.g. ADSL designed component, each new set of ADSL design requirements requires a new design iteration for the component. Furthermore, the once designed components can not be re-used in a new environment with newly defined functionality's such as in the event of ADSL evolution to Very high speed Digital subscriber Line VDSL.

Furthermore, since existing Digital Signal Processor solutions are not dedicated to e.g. the front-end functions of XDSL, too much silicon with its associated extra costs would be required in every XDSL modem.

An object of the present invention is to provide a digital signal processor according to claim 1, and a method being executed by such a digital signal processor according to claim 6, and a digital subscriber line system that comprises a digital front-end system with such a digital signal processor according to claim 5, that defines and generates a flexible Digital Signal Processor which is enabled to be programmed, phase by phase, in a flexible way in order to execute for each phase at least part of a desired dedicated operation and whereby upon realization and finishing of each phase of the control program at least one dedicated operation is executed. By merging one or more of such flexible digital signal processors all desired dedicated operations of a dedicated system according to the actual design requirements and evolution of the dedicated system can be executed.

The digital signal processor according to the present invention to execute at least one dedicated operation of a dedicated system comprises therefor an arithmetic logical unit that comprises a plurality of inputs to receive input data and a predefined interconnected plurality of basic operators which are coupled to this plurality of inputs for the execution of a respective basic operation on the received input data. It has to be remarked here that a basic operation might be executed directly on a received input data or might be executed upon an intermediate result. Furthermore the arithmetic logical unit comprises a plurality of control inputs which are coupled between the predefined plurality of basic operators and a program controller.

The digital signal processor according to the present invention further comprises this program controller in order to activate via the plurality of the control inputs, for at least one phase of a control program of the program controller, and under the control of an actual phase of the control program, one or more basic operators of the plurality of basic operators. Hereby, the activated basic operators are enabled to execute its respective basic operation and are enabled to realize therewith at least part of a desired dedicated operation of the dedicated system.

The arithmetic logical unit further comprises a plurality of outputs to receive, upon realization of each phase of the control program, an output data. This output data represent a result of the execution of the at least one desired dedicated operation of the dedicated system.

It has to be remarked that upon design of the flexible digital signal processor according to the present invention the predefined basic operators and its predefined interconnectivity has to be predefined in function and in association to the desired dedicated operations of the dedicated system. This will become clear by means of the following example. Presume an ADSL system with a dedicated system i.e. a Digital Front End that comprises a flexible digital signal processor according to the present invention with a plurality of predefined basic operators in order to execute at least one dedicated operation i.e. some predefined digital operations for a number of Digital Subscriber Lines without execution of echo-cancellation. In the event when the dedicated system evolves to a further iteration whereby the execution of echo-cancellation becomes a necessary requirement, the arithmetic logical unit with the same predefined basic are re-used. Indeed. It is only the control program that needs to be tuned in order to activate during a newly defined phase of the control program some well-defined basic operators whereby the echo-cancellation can be executed as well. So, it is to be clear that in order to be able to re-use the same arithmetic logical unit ALU with the predefined plurality of basic operators, the basic operators needs to be chosen in function of the dedicated operations that are typical for the dedicated system. In this way the specially designed arithmetic logical unit becomes flexible. Indeed, for e.g. a digital front-end ADSL specially designed ALU component, each new set of digital front-end ADSL design requirements doesn't require a new design iteration for the ALU component.

Furthermore, the once designed arithmetic logical unit with its predefined inter-coupled basic operators can be re-used in a new environment with newly defined functionality's such as in the event of ADSL evolution to Very high speed Digital subscriber Line VDSL by only changing the control program.

It has to be remarked that the changing/adaptation of the control program for an ALU can be executed for the ALU component without removing it from the printed circuit board.

Furthermore, since these interconnected basic operators are defined towards some predefined dedicated operations of a dedicated system such as e.g. the front-end functions of XDSL, no excess of silicon with its extra associated costs is required to firstly produce the predefined arithmetic logical unit for the actual dedicated system and to re-use afterwards this arithmetic logical unit in an eventual evolved dedicated system. Indeed, when using the flexible digital signal processor and method according to the present invention, there is no overload of silicon in the front-end chips of e.g. the XDSL devices and there is flexibility towards new design requirements and new XDSL iterations.

The program controller of the flexible digital signal processor comprises a start input to control a start of an execution of the control program and a finish output to sign a finishing of the control program. Furthermore, a phase of the control program comprises a set of instructions that are designed in accordance to a desired dedicated operation as explained above. These features are described in claim 2.

As it is explained in the above, a possible implementation of a dedicated system with dedicated operations is a digital front-end system of any digital subscriber line system. Possible dedicated functions are e.g. an interpolation operation, a decimation operation, a biquad filter operation, a Finite Impulse Response filter operation, a complex to real operation inversion operation and a real to complex inversion operation. This is described in claim 3 and claim 4.

It has to be remarked that any XDSL Digital Subscriber Line System can be anyone of the inexhaustible list of an Asymmetric Digital Subscriber Line ADSL System, an Asymmetric Digital Subscriber Line Plus ADSL+ system, an Symmetric Digital Subscriber Line SDSL system, a High Speed Digital Subscriber Line HDSL system or a Very high speed Digital Subscriber Line VDSL system.

Finally an important possible implementation of the flexible digital signal processor according to the present invention is that such a dedicated system comprises one or more flexible digital signal processors according to the present invention. This is described in claim 5. Indeed, by designing one flexible digital signal processor with a dedicated Arithmetic Logic Unit and a control program with an instruction set and with potential for interconnection of the clock logic part for interconnecting a plurality of such flexible digital signal processors the realization of nearly the complete dedicated system e.g. the complete digital front end system of a DSL system can be realized by using only components according to the present invention.

A remark to the method to execute at least one dedicated function of a dedicated system is that, although the different steps are described in the claim 5, the one after the other, the method of the present invention is not limited to an execution of the different steps in this sequence. This will become more clear with the description of a later example.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

Figure 2:
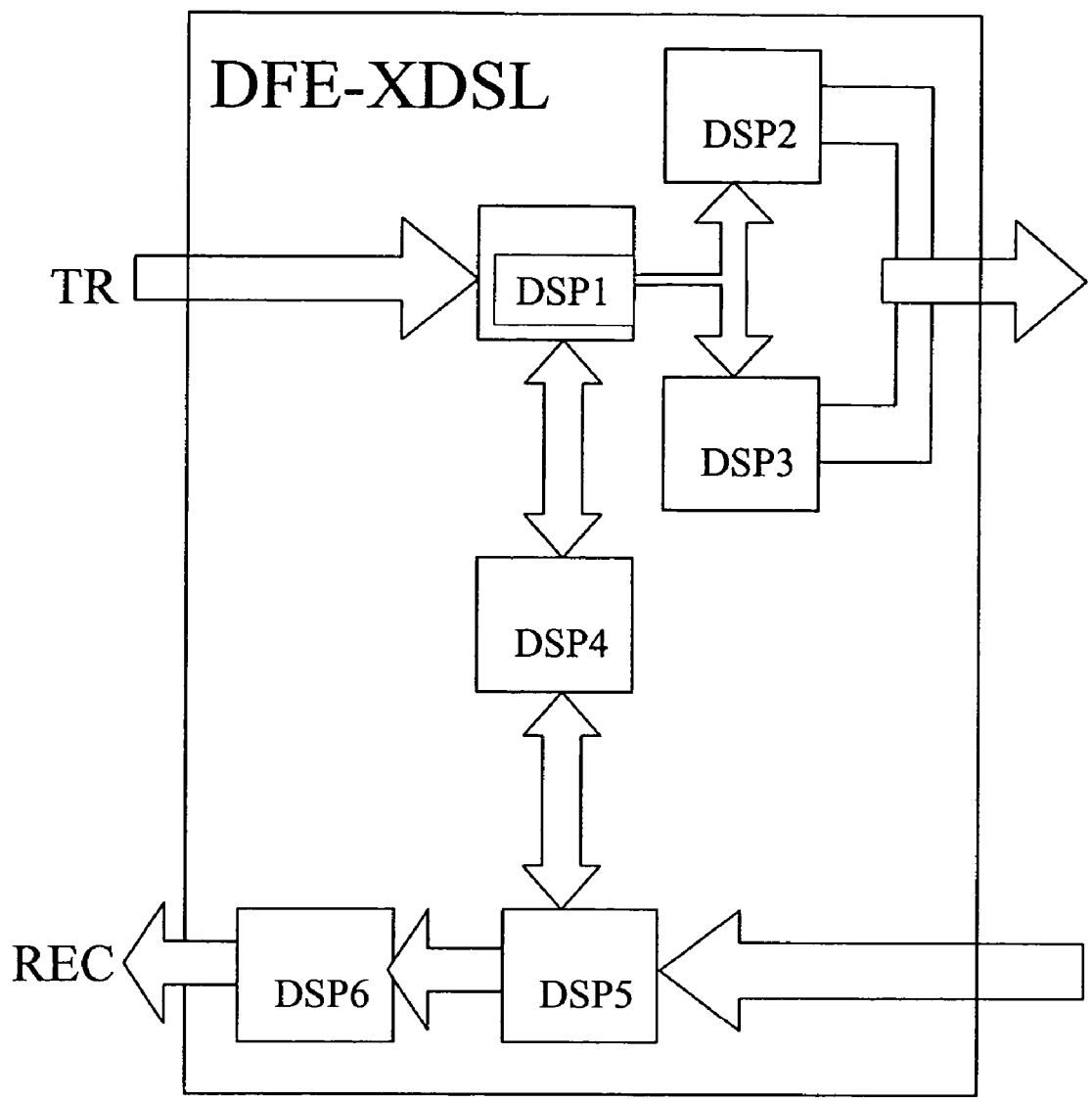

The above and other objects and features of the invention will become more apparent and the invention itself will be best understood by referring to the following description of an embodiment taken in conjunction with the accompanying drawings wherein:

FIG. 1 represents a flexible digital signal processor according to the present invention; and FIG. 2 represents a digital front end of an XDSL system that comprises a plurality of flexible digital signal processors according to the present invention.

The working of the device according to the present invention in accordance with a possible telecommunication environment as shown in FIG. 2 will be explained by means of a functional description of the different blocks shown therein. Based on this description, the practical implementation of the blocks will be obvious to a person skilled in the art and will therefor not be described in details. In addition, the principle working of the method to execute at least one dedicated operation of a dedicated system will be described in further detail.

The preferred dedicated system in order to describe a possible implementation of the present invention is a digital front end of an XDSL system DFE-XDSL. The global functionality of such a digital front-end system will here not be explained in details since it goes beyond the aim of the present invention. The aim is that such a digital front-end system of an XDSL system comprises some typical dedicated digital signal processing functions. Such dedicated functions of a dedicated system can be realized by developing a flexible digital signal processor according to the present invention and by using the method to execute a dedicated operation according to the present invention.

In order to realize the digital front-end functions of the dedicated XDSL system, the digital front-end comprises 6 flexible digital signal processors. Referring to FIG. 2, a digital front end of an XDSL system DFE-XDSL that comprises a plurality of flexible digital signal processors DSP1, DSP2, DSP3, DSP4, DSP5 and DSP6 according to the present invention is shown. In how much these flexible digital signal processors are similar and are different will be explained in a further paragraph. FIG. 2 shows a dedicated splitting of the six flexible digital signal processors DSP1, DSP2, DSP3, DSP4, DSP5 and DSP6 over the transmit data path TR and the receiving data path REC of the digital front-end. In this way DSP1, DSP2, DSP3 and DSP4 are executing typical dedicated functions which are needed in the transmit part of the digital front end DFE-XDSL. The flexible digital signal processor DSP1 shows a vertical splitting of its functions with the functions to be executed by DSP2 with DSP3 and DSP4. DSP2 and DSP3 have a mutual horizontal splitting of their functions and DSP4 shows an inter-relation with the receiving path of the digital front-end DFE-XDSL. The receiving path REC shows a vertical splitting of the different functions to be realized between DSP5 and DSP6. Furthermore a horizontal splitting is realized between DSP5 and DSP4. This flexible system shows how a plurality of flexible digital signal processors DSP's according to the present invention can be used in order to realize the dedicated functions such as an interpolation operation, a decimation operation, a biquad filter operation, a Finite Impulse Response filter operation, a complex to real operation inversion operation and a real to complex inversion operation of a digital front-end DFE-XDSL.

Furthermore, it has to be remarked that although some predefined dedicated operations are realized according to the shown example of inter-coupling of the different flexible digital signal processors, other dedicated functions can be realized with the same set of flexible digital signal processors by only changing the inter-coupling of the processors. This means that a second level of flexibility is reached for the flexible digital signal processor of the present invention and for the method to realize at least one dedicated function of a dedicated system according to the present inventions.

The first level of flexibility is the enabled re-programming of the arithmetic logical unit ALU whereas the second level of flexibility is the enabled interchangeability of a pre-defined set of digital signal processors.

Referring to FIG. 1, a flexible digital signal processor DSP1' according to the present invention is shown. The flexible digital signal processor DSP1' is the first one (DSP1) in the transmit path of the front-end-XDSL dedicated system of FIG. 2. One of its dedicated functions to realize is a biquad operation. This will be explained in more detail in a later paragraph.

The flexible digital signal processor DSP1' comprises an arithmetic logical unit ALU, a plurality of inputs IN, a plurality of control inputs IN-CTRL and a plurality of outputs OUT.

Since the exact coupling to the internal functional blocks and the number of an inputs/outputs goes beyond the aim of the basic idea, it has to be remarked that each plurality of inputs/outputs might comprise one or more physical inputs/outputs. However, in order not to overload the FIG. 1 only one broad arrow is shown for each plurality of input/outputs. Also the exact coupling of the inputs/outputs to the different internal functional blocks is only shown as a matter of possible example.

The arithmetic logical unit ALU comprises a predefined interconnected plurality of basic operators OP1, OP2, OP3, OP4, OP5, OP6 and OP7. Only, as a matter of example it is shown in FIG. 1 that the basic operator OP2 comprises a multiplier and that the basic operator OP6 comprises an adder. Furthermore, basic operator OP1 and OP3, each comprise a multiplexer.

As explained above, the interconnection of the different basic operators must be well considered at design time of the arithmetic logical unit ALU. As an example the interconnection between the different basic operators is shown in FIG. 1 with the full lines and the dotted lines e.g.: basic operator OP3 is directly coupled to basic operator OP1 and basic operator OP2; basic operator OP5 is directly coupled with an input to the second register REG2 and basic operator OP7 and with an output again to basic operator OP7. All interconnections will not be further described here since they can be seen clearly in FIG. 1. It has to be repeated that at design time of the arithmetic logical unit ALU the interconnection of the different operators could have been designed in another way.

Furthermore, the arithmetic logical unit comprises a first register REG1 and a second register REG2. The number and places of the registers REG1 and REG2 is also a decision, which has to be taken at design time. They are not essential functional blocks of the arithmetic logical unit ALU of a flexible digital signal processor according to the present invention DSP1'. A flexible digital signal processor according to the present invention might as well be pre-defined without any register in the arithmetic logical unit ALU.

Besides the Arithmetic Logical Unit ALU, the flexible digital signal processor DSP comprises a program controller CTRL.

The program controller CTRL is coupled via the control inputs IN-CTRL to the different basic operators of the Arithmetic Logical Unit.

The plurality of inputs IN are each coupled to one or more of the interconnected basic operators OP1, OP2, OP3, OP4, OP5, OP6 and OP7.

In this way, only basic operator OP1 and OP2 are directly coupled to an input of the plurality of inputs IN.

One or more of the basic operators OP1, OP2, OP3, OP4, OP5, OP6 and OP7 are coupled to the plurality of outputs OUT. In this way, basic operator OP4, basic operator OP6 and basic operator OP7 are directly coupled to one of the outputs of the plurality of outputs OUT.

According to this preferred embodiment, The first register REG1 is coupled to one of the inputs of the plurality of inputs IN, to one of the outputs of the plurality of outputs OUT and to basic operator OP2, basic operator OP3, basic operator OP4 and to basic operator OP6.

Furthermore, according to this preferred embodiment, the second register REG2 is coupled to one of the inputs of the plurality of inputs IN and to basic operator OP1.

The plurality of inputs IN are included to receive input data DATA-IN of the XDSL system and to provide this input data DAT-IN to one or more of the basic operators OP1, OP2, OP3, OP4, OP5, OP6 and OP7.

The program controller is included to activate via the plurality of control inputs, for at least one phase of a control program of the program controller CTRL and under control of an actual phase of the at least one phase, one or more of the basic operators e.g. OP1, OP3, OP2 and OP6 of the plurality of basic operators OP1, OP2, OP3, OP4, OP5, OP6 and OP7 and to enable thereby the one or more activated basic operators OP1, OP3, OP2 and OP6 to execute its respective basic operation and to realize therewith at least part of a dedicated operation of the dedicated system DFE-XDSL.

The program controller CTRL comprises a start input (not shown) to control a start of an execution of the control program and a finish output (not shown) to sign a finishing of the control program. A control program of a particular flexible digital signal processor DSP1' comprises a pre-defined number of phases. Each phase of the control program comprises a set of instructions. This set of instructions is especially designed in accordance to a realization of a desired dedicated operation. It has to be explained that the program controller CTRL works at a rhythm of a so-called master-clock. Upon each tick of the master-clock an instruction of a phase of the control program is executed. Such instruction comprises the setting and/or disabling of one or more of the basic operators. When a particular phase of the control program is totally executed, at least part of a dedicated operation such as e.g. a BIQUAD operation will be realized.

It has to be explained here that after execution of an instruction, intermediate data might be generated and might be stored temporarily in one of the defined registers REG1 or REG2. This temporary data might be afterwards looked up again in the registers in order to be applied to one or the other basic operator and in order to undergo the associated basic operation. Furthermore the registers REG1 and REG2 are also comprised in order to store e.g. permanent some predefined values such as coefficients of a filter or a multiplication. This does not mean that all needed coefficients must be stored in such a register of the pre-defined arithmetic logical unit ALU.

Upon realization of each phase of the different phases of the control program i.e. upon realization of the total control program an output data DATA-OUT is generated and is applied to the plurality of output OUT. This output data DATA-OUT represent a result of the execution of the at least one dedicated operation of the dedicated system DFE-XDSL. This means that the first flexible digital signal processor DSP1' will have been executed at least one dedicated operation e.g. a BIQUAD operation.

According to the intensity of a dedicated operation and according to the number of instructions needed in order to realize a dedicated operation, the number of dedicated operations that could be realized with one control program could be variant. As a matter of example a simple BIQUAD operation can be realized with five instruction lines.

According to the above remark, and since the control program typically comprises a predefined maximum number of possible instruction lines the number of dedicated functions that can be realized under the control of the control program is limited. Indeed, although that the content of an instruction line can be changed in order to e.g. activate at execution time of the control program another basic operator and in order to thereby realize another part of a dedicated function, the maximum number of possible instruction lines of the control program is fixed.

This means that the flexibility of the flexible digital signal processor lies in the fact that a same arithmetic logical unit ALU with pre-determined interconnected basic operators is used and for the execution of other dedicated functions of the dedicated system under the control of another set of instruction lines of another control program of the program controller CTRL. This clarifies for the six flexible digital signal processors DSP1, DSP2, DSP3, DSP4, DSP5 and DSP6 of FIG. 2 the similar part i.e. the predefined ALU with the predefined controller CTRL; and the differentiator between them i.e. the actual content of the instructions of the control program.

Furthermore, it has to be explained that a same flexible digital signal processor according to the present invention can be re-used in order to realize another plurality of dedicated operations by only changing the content of the instruction lines of a control program.

It has to be clear that the manipulation of the addresses and content of the two registers REG1 and REG2 needs to be controlled as well and thereby needs to be included in the instruction lines of the control program as well. However, this will not be explained in detailed since this goes beyond the aim of the present invention and can be implemented by a person skilled in the art.

As a matter of example a particular phase of the method to execute at least one dedicated operation will be described now. In order to show the realization of one of the dedicated operations of a digital front end of a digital subscriber line DFE-XDSL, a BIQUAD operation is chosen as an example and will be explained below.

The program controller CTRL works at a rhythm of the above-mentioned master-clock. The sample-clock is the speed whereby the flexible digital signal processor receives the offered DATA-IN.

The sample-clock and the master-clock are defined in relation to each other. At each master-clock tick, an instruction line will be executed. At each sample-clock tick a sample DATA-IN is received by the flexible digital signal processor and a result DATA-OUT is provided at the output OUT of the digital signal processor DSP1'. In order to realize the BIQUAD operation, the sample-clock ticks one time for every five ticks of the master-clock.

It has to be remarked that the BIQUAD operation is a simplified BIQUAD operation, which is realized with only five instruction lines of the control program.

Referring to FIG. 1, the dotted lines are the connections between the different basic operators that are used to realize the BIQUAD operation.

The used basic operators are OP1, OP2, OP3 and OP6. Also the first and second register REG1 and REG2 are used to realize this dedicated function. The basic operation of each basic operator will now be explained in more detail. It has to be understood that a further detailed description of the implementation of these functional blocks with electronic components will not be given here since it is taken as apparent for a person skilled in the art.

REG2 receives a sample of DATA-IN from one of the inputs of the plurality of inputs IN and provides this sample DATA-IN at the right clock-tick and under control of an actual instruction line of an actual phase of the control program to OP1; and OP1 is a multiplexer and receives a previous sample DATA-IN from the second register REG2 and an actual sample DATA-IN directly from one of the inputs of the plurality of inputs IN; and either to one or the other input is provided to the output of OP1 and is further provided to the input of OP3; and OP3 is also a multiplexer and receives data from OP1 and from the first register REG1; the input of one or the other is provided to OP2;

OP2 comprises a multiplexer and a multiplier; the multiplier receives it data to be multiplied from OP3 and its coefficient from the multiplexer of OP2; the multiplexer of OP2 receives the coefficient either from the first register or directly from one of the inputs from the plurality of inputs IN and provides one or the other to the multiplier of OP2; and OP6 comprises an adder with an accumulator; the accumulator can be re-set in order to put the value of the accumulator on zero; the adder receives its first term from OP2 and its second term from the accumulator of OP6; in this way a new input is each time by the temporarily result of the accumulator; the accumulator also provides (under control of an instruction of the control program) its result to the first register REG1 and to one of the outputs of the plurality of outputs OUT.

REG1 stores as well samples DATA-IN received directly from one of the inputs of the plurality of inputs IN, or received from the output of the adder operation OP6; and provides input samples DATA-IN to the or operation OP3 and provides values coefficients to e.g. the multiplication operation of OP2.

The instruction lines to realize the simplified BIQUAD operation have the following content:

Instruction line 1:

REG1: provide output value of two previous master-clock ticks $(Z\_out)^{-2}$ to OP3;

OP3: active an provides this value to OP2;

REG1: provide multiplication-coefficient b2 to OP2;

OP2: active and executes $\{b2*(Z\_out)^{-2}\}$ and provides the result to OP6;

OP6: re-set its accumulator and stores the result of $\{b2*(Z\_out)^{-2}\}$;

Instruction line 2:
REG1: provide output value of one previous master-clock tick $(Z\_out)^{-1}$ to OP3;
OP3: active an provides this value to OP2;
REG1: provide multiplication-coefficient b1 to OP2;
OP2: active and executes $\{b1*(Z\_out)^{-1}\}$ and provides the result to OP6;
OP6: adds the result of $\{b1*(Z\_out)^{-1}\}$ in its accumulator;
REG1: store the output value of one previous master-clock tick $(Z\_out)^{-1}$ at the register place of the output value of two previous master-clock ticks $(Z\_out)^{-2}$;
Instruction line 3:
REG1: provide input value of two previous master-clock ticks $(Z\_in)^{-2}$ to OP3;
OP3: active and provides this value to OP2;
REG1: provide multiplication-coefficient a2 to OP2;
OP2: active and executes $\{a2*(Z\_in)^{-2}\}$ and provides the result to OP6;
OP6: adds the result of $\{a2*(Z\_in)^{-2}\}$ in its accumulator;
Instruction line 4:
REG1: provide input value of one previous master-clock tick $(Z\_in)^{-1}$ to OP3;
OP3: active an provides this value to OP2;
REG1: provide multiplication-coefficient a1 to OP2;
OP2: active and executes $\{a1*(Z\_in)^{-1}\}$ and provides the result to OP6;
OP6: adds the result of $\{a1*(Z\_in)^{-1}\}$ in its accumulator;
REG1: store the input value of one previous master-clock tick $(Z\_in)^{-1}$ at the register place of the input value of two previous master-clock ticks $(Z\_in)^{-2}$;
Instruction line 5:
OP1: active and reads actual value i.e. DATA-IN and provides it to OP3;
OP3: active an provides this value to OP2;
REG1: provide multiplication-coefficient a0 to OP2;
OP2: active and executes $\{a0*(DATA-IN)\}$ and provides the result to OP6;
OP6: adds the result of $\{a0*(DATA-IN)\}$ in its accumulator;
REG1: store the actual input value DATA-IN at the register place of the input value of one previous master-clock tick $(Z\_in)^{-1}$;
OP6: active and provides the total accumulated result DATA-OUT to register REG1;
OP6: active and provides the total accumulated result DATA-OUT to an output OUT:
REG1: store the total accumulated result DATA-OUT at the register place of the output value of one previous master-clock tick $(Z\_out)^{-1}$;

It has to be remarked that although according to this present example the required coefficients for the multiplication were all stored in the first register REG1, the present invention is not limited to implementations with only coefficients in a register being comprised in the arithmetic logical unit ALU. Indeed the small changes, evident to a person skilled in the art, might be applied to the above description in order to provide an implementation with the storage of such coefficients in a register/memory outside the flexible digital signal processor.

Such considerations are subject to the definition and selection of the basic operators at design time of the arithmetic logical unit ALU and are related to the desired dedicated operations of the dedicated system.

Presume that an available control program has 64 available program lines i.e. instruction lines. This means that after the realization of a simplified BIQUAD operation still 59 instruction lines are available.

Some typical dedicated operations of the dedicated system DFE-XDSL are e.g. a 6th order BIQUAD operation followed by three steps of interpolation.

The following instruction-lines are thus determined, in order to realize a second and a third BIQUAD operation, an interpolation (one sample input will provide 2 sample outputs) and a second and third interpolation (providing hereby 8 sample outputs).

All these instruction lines are stored in the control program of the program controller CTRL of the flexible digital signal processor DSP1'.

At operational time of the flexible digital signal processor DSP1', upon reception of a start input by the program controller CTRL, the first instruction line of the first phase is provided to the arithmetic logical unit ALU whereby the ALU executes the first instruction line with REG1, OP2, OP3 and OP6. Hereafter the second instruction line is provided to the ALU and executed. After realization of each phase of the control program, the final result i.e. output data DATA-OUT is provided to an output of the plurality of outputs OUT. This output data represents a result of the execution of the at least one dedicated operations i.e. 6th order BIQUAD operation followed by three steps of interpolation, of the dedicated system DFE-XDSL.

In the event when for instance in a new iteration of the dedicated system DFE-XDSL, the BIQAUD operations should be fine-tuned to more accurate BIQUAD operations, whereby e.g. seven instruction lines would be needed, the flexible digital signal processor stays on the printed circuit board and only the instruction lines of the control program needs to be adapted and stored again in the program controller. In this way, the same processor with the same ALU is re-used in order to adapt the dedicated system to this new iteration of the dedicated system. Moreover, this adaptation is reached according to a time-efficient and silicon-efficient solution.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A digital signal processor to execute at least one dedicated operation of a dedicated system, characterized in that said digital signal processor is a flexible digital signal processor and comprises:
    an arithmetic logical unit that comprises a plurality of inputs to receive input data; and a predefined interconnected plurality of basic operators coupled to said plurality of inputs (IN) for execution of a respective basic operation on said received input data; and a plurality of control inputs coupled between said predefined plurality of basic operators and a program controller; and
    said program controller to activate via said plurality of control inputs, for at least one phase of a control program of said program controller and under control of an actual phase of said at least one phase, one or more basic operators of said plurality of basic operators and to enable thereby said one or more basic operators to execute its respective basic operation and to realize therewith at least part of a dedicated operation of said dedicated system; and said arithmetic logical unit further comprises a plurality of outputs to receive, upon realization of each phase of said at least one phase of said control program, an output data whereby said output data represent a result of said execution of said at least one dedicated operation of said dedicated system.

2. The flexible digital signal processor according to claim 1, characterized in that said program controller comprises a start input to control a start of an execution of said control program and a finish output to sign a finishing of said control program and further characterized in that a phase of control program comprises a set of instructions being designed in accordance to a desired said at least one dedicated operation.

3. The flexible digital signal processor according to claim 1, characterized in that said dedicated system is a digital front-end system of any digital subscriber line system.

4. The flexible digital signal processor according to claim 3, characterized in that a dedicated operation of said dedicated system is anyone of an interpolation operation, a decimation operation, a biquad filter operation, a Finite Impulse Response filter operation, a complex to real operation inversion operation and a real to complex inversion operation.

5. A digital subscriber line system that comprises a digital front-end system, characterized in that said digital front-end system comprises one or more flexible digital signal processors according to claim 1.

6. A method to execute at least one dedicated operation of a dedicated system by a digital signal processor, characterized in that said method comprises:

receiving input data by a plurality of inputs coupled to a predefined plurality of interconnected basic operators of an arithmetic logical unit of said flexible digital signal processor; and for at least one phase of a control program of a program controller:

activating via a plurality of control inputs being coupled between said predefined plurality of basic operators and said program controller, under control of an actual phase of said control program, one or more basic operators of said predefined plurality of basic operators ; and executing on said received input data one or more basic operations by said one or more activated basic operators of said dedicated system; and realizing each phase of said at least one phase of said control program and generating thereby an output data representing a result of said execution of said at least one dedicated operation of said dedicated system.

* * * * *